United States Patent [19]

Samuel et al.

[11] Patent Number: 4,566,035

[45] Date of Patent: Jan. 21, 1986

[54] CRT MONITOR WITH BUILT-IN CAMERA

[75] Inventors: Robert A. Samuel, Snohomish; Gary J. Selke, Seattle; Russell W. Morris, Redmond, all of Wash.

[73] Assignee: Advanced Technology Laboratories, Inc., Bothell, Wash.

[21] Appl. No.: 476,460

[22] Filed: Mar. 18, 1983

[51] Int. Cl.⁴ .............................................. H04N 5/84
[52] U.S. Cl. .................................. 358/244; 358/345; 346/110 R
[58] Field of Search ................. 358/244, 244.1, 244.2, 358/345, 254; 346/110 R; D14/54, 77

[56] References Cited

U.S. PATENT DOCUMENTS

D264,081  4/1982  Sekita et al. .......................... D14/3

OTHER PUBLICATIONS

Hewlett-Packard Journal, pp. 18–20, Apr. 1970.

Primary Examiner—Robert L. Richardson
Attorney, Agent, or Firm—Lawrence S. Levinson; Sanford J. Asman

[57] ABSTRACT

The CRT is pivotally mounted in an enclosure which includes an integral camera. Photographs of the image on the screen of the CRT can be made by depressing the CRT and exposing the photograph.

6 Claims, 4 Drawing Figures

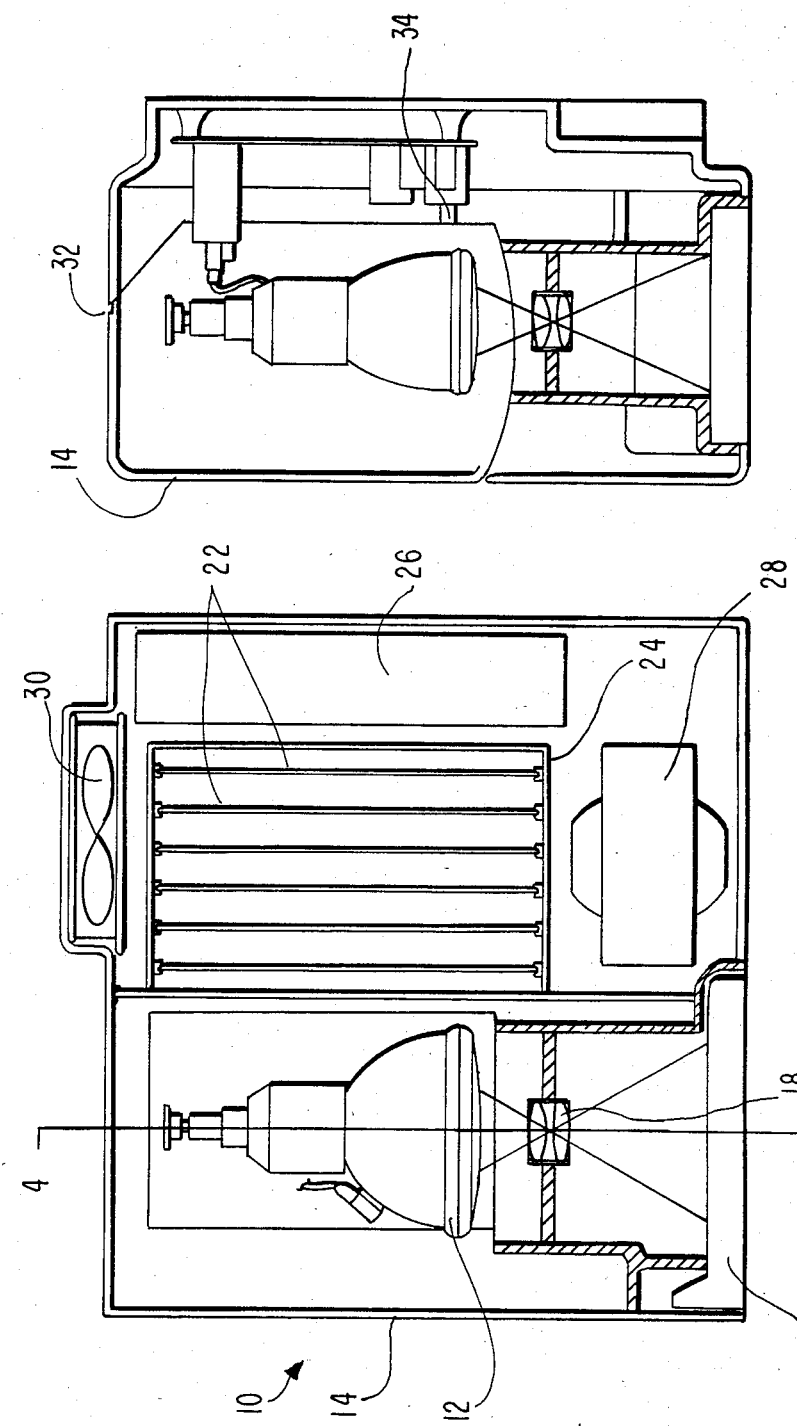

CRT MONITOR WITH BUILT-IN CAMERA

BACKGROUND OF THE INVENTION

The present invention relates to a cathode ray tube (CRT) monitor which includes means for producing photographics from images produced on the screen of a CRT display.

It is often desirable to photograph an image produced on a CRT display which is used in monitoring apparatus. Existing techniques for producing photographs from CRTs typically require a long focal length optical system, i.e., an optical system having a focal length on the order of 10 to 20 inches. Such long focal length optical systems result either in a large, awkward camera which usually attaches to the exterior of the CRT, or alternatively, they result in an expensive multiple lens optical system.

A low cost, short focal length optical system would be desirable. Also, a compact CRT monitor with a pop-up screen and a built-in camera for producing photographs would be desirable.

SUMMARY OF THE INVENTION

The present invention is a CRT monitor which has a built-in camera for producing photographs of the images displayed on the CRT. The invention comprises a housing in which the camera is located, together with a CRT monitor which is pivotally mounted so that it can be in either a popped-up "viewing" position, or a depressed "photographing" position.

BRIEF DESCRIPTION OF THE DRAWING

In the Drawing:

FIG. 3 is a cross-sectional top view of the CRT monitor of FIG. 1; and

FIG. 4 is a cross-sectional side view of the CRT monitor of FIG. 1 taken along the line 4—4 of FIG. 3.

DETAILED DESCRIPTION OF AN EXEMPLARY EMBODIMENT

Figure 1:
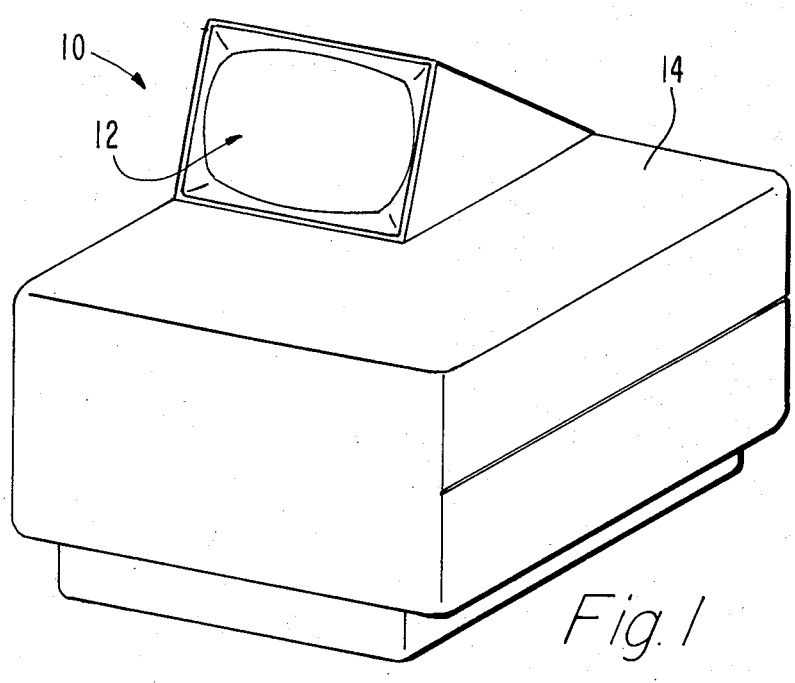
FIG. 1 is a perspective view of a CRT monitor in accordance with the present invention in which the CRT is in its "viewing" position.
Figure 2:
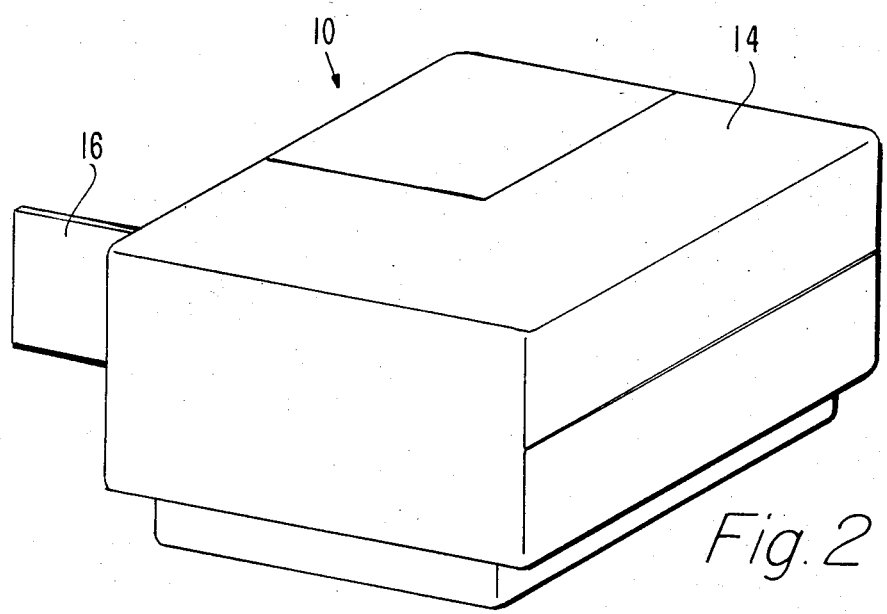
FIG. 2 is a perspective view of the CRT monitor of FIG. 1 with the CRT in its "photographing" position, and with a photograph being ejected therefrom.

Referring generally to FIGS. 1 and 2, the present invention relates to a compact CRT monitor 10 with a built-in camera for producing photographs from the screen of the CRT 12. It is particularly useful for recording data from the type of CRT display which is used in monitoring devices, such as medical monitors, oscilloscopes, and related apparatus.

The preferred embodiment of the present invention is a relatively compact combination CRT monitor-camera unit 10 of the type shown in FIG. 1. The unit 10 incorporates a pop-up CRT screen 12 which is pivotally mounted in a housing 14. The CRT screen 12 is shown in its popped up "viewing" configuration in FIG. 1 and in its depressed "photographing" configuration in FIG. 2. In the depressed configuration, a photograph 16 of an image on the CRT screen 12 can be produced in a manner which will be explained hereinafter.

With reference to FIG. 3, the main components contained within the housing 14 include the CRT 12, a lens 18, and an apparatus 20 for holding a light-sensitive medium in a plane parallel to the CRT screen 12 while an image is projected from the CRT screen 12 onto the light sensitive medium.

In the preferred embodiment of the invention, the light sensitive medium is an "instant" photo, produced on a device such as Polaroid's SX-70 brand "film" system, and the apparatus 20 is comprised of the film holding and handling portion of such a device. As will be obvious to those skilled in the art, other mechanisms and films can be used without departing from the present invention. However, the particular choice of the Polaroid unit enables a fully electronic interface to be made to the camera mechanism 20.

The lens 18 is preferably selected to be one which enlarges the image on the screen of the CRT 12 for projection onto the light sensitive medium. This provides an advantage in that when the CRT screen 12 is depressed for photographing, the image on the screen 12 can be reduced by providing a smaller raster area on the screen 12. A particular advantage of photographically enlarging the image on the sceen 12 via the lens 18, rather than by having a larger raster area on the screen 12 is that various optical errors, such as the "barrel" effect and the "pin cushion" effect, which are produced by a large raster scan are substantially eliminated when a smaller raster scan area is utilized. This particular advantage of the present invention provides photographs which are optically more accurate than the original, enlarged displayed image.

While the present invention relates to the use of the film mechanism 20 in the housing 14 in conjunction with a pivotally mounted CRT 12, as will recognized by those of ordinary skill in the art, with reference to FIGS. 3 and 4, the unit 10 also comprises the electronics necessary for the particular monitoring application. Accordingly, various printed circuit boards 22 are mounted in a card cage 24 in the standard manner. Provision is made for locating a power supply 26 within the housing 14 with an isolation transformer 28 adjacent to the front of the card cage 24. A cooling fan 30 is mounted at the rear of the cabinet 14.

With reference to FIG. 4, the back of the cabinet 14 includes a hinge 32 which allows the CRT display 12 to pivot upward into the viewing position. As will be recognized by those skilled in the art, a variety of pivoting means, such as a piano hinge or other types of hinges can be formed as an integral part of the housing 14 which can be used to accomplish the desired result. In the preferred embodiment of the invention, when the CRT display 12 is in its depressed position, a microswitch 34, shown in FIG. 4, is depressed in order to enable the camera electronics.

We claim:

1. An improved CRT monitor of the type comprising a memory unit which stores pixcels of information which are then displayed on the screen of said CRT comprising:
  (a) a cabinet for said CRT;
  (b) means for moving said CRT from a depressed position within said cabinet to a raised "viewing" position;
  (c) an apparatus within said cabinet for holding a light-sensitive medium in a plane parallel to the screen of said CRT, said apparatus being separated from the screen of said CRT;
  (d) a lens which projects an image from said CRT onto said light-sensitive medium whereby the image on said CRT will be projected onto said light-sensitive medium; and (e) means for producing a photograph of said image on said light-sensitive medium.

2. The improved CRT monitor of claim 1 wherein said means for moving said CRT from said depressed position within said cabinet to said raised "viewing" position comprises a hinge on the rear of said cabinet.

3. The improved CRT monitor of claim 2 further comprising means for sensing when said CRT is in said depressed position.

4. The improved CRT monitor of claim 3 wherein said means for sensing when said CRT is in said depressed position comprises an electrical switch which is depressed by said CRT monitor when said CRT monitor is in its depressed position.

5. The improved CRT monitor of claim 1 wherein said lens which projects an image from said CRT onto said light-sensitive medium enlarges said image on said light-sensitive medium with respect to its size on said CRT.

6. The improved CRT monitor of claim 5 wherein said means for producing a photograph of said image comprises an instant photo system.

* * * * *